April 30, 1968  A. R. NUGARUS  3,380,704
VALVE
Filed June 14, 1965
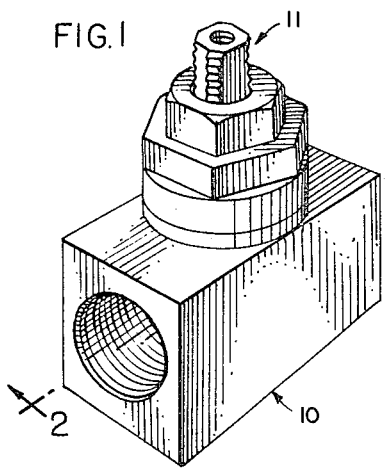
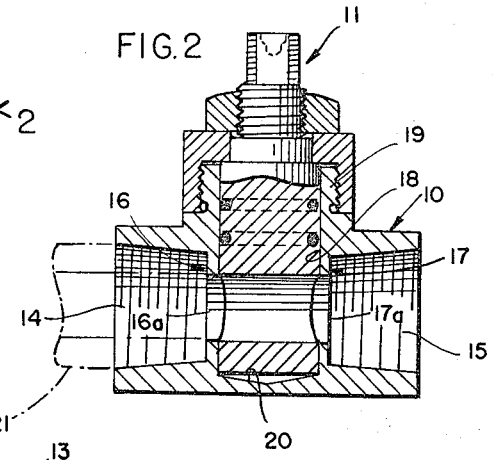
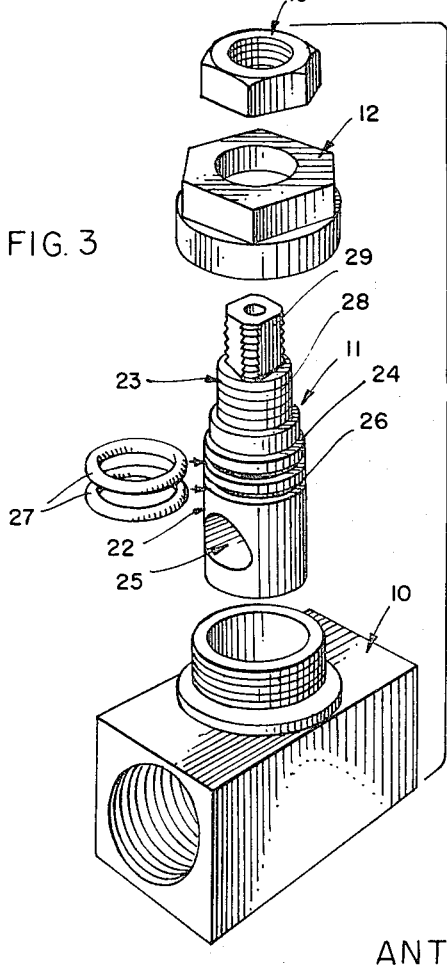
INVENTOR:
ANTHONY R. NUGARUS
BY
Marzall, Johnston, Cook & Root
ATT'Y

United States Patent Office 3,380,704
Patented Apr. 30, 1968

3,380,704
VALVE
Anthony R. Nugarus, Chicago, Ill., assignor to Crompton & Knowles Corporation, Worcester, Mass., a corporation of Massachusetts
Filed June 14, 1965, Ser. No. 463,660
4 Claims. (Cl. 251—89)

ABSTRACT OF THE DISCLOSURE

A control valve for handling high viscosity materials at elevated temperatures and pressures including a valve body having a cylindrical plug bore therein and coaxially aligned inlet and outlet ports, coaxially aligned openings through and normal to the plug bore communicating respectively with the inlet and outlet ports, seats formed in the body by the openings in the plug bore leading to the inlet and outlet ports, a cylindrical plug rotatably mounted in the plug bore and having a minimum of tolerance therewith and a transversely extending passageway coacting with the seats, and at least one O-ring around the periphery of the plug sealing with the plug bore.

---

This invention relates in general to a valve, and more particularly to a valve capable of controlling fluid flow between two points, and still more particularly to a valve capable of withstanding high temperatures and pressures while handling highly viscous materials and yet being small and compact in size, although other uses and purposes may be apparent to one skilled in the art.

Heretofore, valves of all types and sizes have been developed, but none had been developed which is capable of handling material having a viscosity up to 100,000 centipoises, and operating at a temperature up to 500° F. and at pressures up to 2,000 pounds per square inch, while yet being small and compact in size.

The valve of the present invention is primarily useful in controlling the fluid flow between two points, and includes a valve body having integrally formed valve seats coacting with a rotatable plug having an opening therethrough, wherein the tolerances between the surfaces of the plug and seats are minimal and wherein the surfaces are provided with a finish of no more than 32 microinches and preferably 2–4 microinches. Means is also provided to lock the plug in any position so as to maintain a desired flow rate.

It is therefore an object of the present invention to provide a new and improved valve for controlling the flow of fluids between two points.

Another object of the present invention is in the provision of a valve capable of withstanding high temperatures and pressures while handling highly viscous materials, and which is small and compact in size for use in relatively small areas.

Still another object of this invention resides in the provision of a valve including a body having integral seats and a plug coacting with the seats, wherein the tolerance between the surfaces of the plug and seats is minimal and the finish on the surfaces is very fine.

A further object of this invention is to provide a valve that is compact and small in size but yet capable of withstanding pressures up to 2,000 pounds per square inch, temperatures up to 500° F., and the flow of materials having a viscosity up to 100,000 centipoises.

A still further object of this invention resides in the provision of a small and compact fluid control valve capable of being positively locked in any fluid control position for maintaining constant fluid flow rate therethrough.

Other objects, features and advantages of the invention will be apparent from the following detailed disclosure, taken in conjunction with the accompanying sheet of drawings, wherein like reference numerals refer to like parts, in which:

FIG. 1 is a perspective view of the valve of the present invention;

FIG. 2 is a vertical sectional view taken through the valve of FIG. 1 showing some parts in elevation for purposes of clarity; and FIG. 3 is a perspective exploded view of the valve of the present invention.

Referring now to the drawings, the valve of the present invention includes generally a valve body 10, a valve stem and plug 11, a valve cap 12 and a lock nut 13.

The valve body 10 includes axially aligned and oppositely disposed inlet and outlet ports 14 and 15, valve seats 16 and 17 at the inlet and outlet ports, respectively, a plug bore 18 extending normal to the axes of the inlet and outlet ports, and an externally threaded boss 19 adapted to threadedly receive thereon the valve cap 12. The inlet and outlet ports are suitably tapped for connection to pipes, and it should be appreciated that flow through this valve may be in either direction, and therefore, the inlet and outlet ports might respectively function as outlet and inlet ports.

The plug bore 18 extends above and below the valve seats 16 and 17, and especially above and below the openings 16a and 17a of the valve seats, and includes a bottom 20 against which the valve stem and plug 11 abuts when it is properly installed within the valve body. It may be noted that the tapped ports are such that a pipe such as 21, when properly mounted in the inlet port 14, will have its inner diameter substantially aligned with the opening 16a in the valve seat 16. Because the inside diameter of the pipe is the same as the opening 16a, turbulence at this point is minimized if not completely eliminated. Moreover, the depth of the tapped port is such as to permit bottoming of the pipe 21 to further reduce the possibility of turbulence.

The valve stem and plug 11 includes a plug portion 22 adapted to be received within the plug bore 18, and a stem portion 23 adapted to extend outwardly of the plug bore 18. A shoulder 24 is formed at the upper end of the plug portion 22 for coacting with the valve cap 12 to retain and position the valve stem and plug 11 within the body 10. A fluid passageway 25 extends transverse the plug portion and is adapted to be in alignment with the openings 16a and 17a when the valve stem and plug is mounted within the valve body. More particularly, when the valve is in fully open position, the passageway 25 fully aligns with the openings 16a and 17a of the valve seats. Restricted flow is obtained through the valve when the passageway is otherwise positioned relative to the valve seat openings.

In order to prevent leakage along the valve stem and plug, a pair of O-ring grooves 26 are provided to receive a pair of O-rings 27.

In order to selectively lock the valve stem and plug in a position relative to the valve body, a threaded portion 28 is provided along the valve stem for engagement with the lock nut 13, wherein turning of the lock nut down against the valve cap 12 tightly will effect locking of the valve stem and plug 11 relative to the valve body. Conversely, loosening of the nut will permit rotation of the valve stem and plug. A wrench engaging portion 29 is provided above the portion 28 for receiving a suitable wrench for turning the valve stem and plug relative to the body.

The tolerance between the plug bore 18 and the plug portion 22 of the valve stem and plug 11 is between .0002–.0006 inch in order to obtain a close and tight fit between these parts. Further, the surfaces of the plug portion and the bore are chrome plated, lapped and ground to a finish of about 2–4 microinches. In any event, the finish is no coarse than 32 microinches.

To illustrate the compactness of size of the body, the dimension along its length is about 2¼ inches while the width is about 1¼ inches, and the other parts are proportionately dimensioned.

In view of the foregoing, it can be appreciated that the valve of the present invention is compact in size and of relatively light weight, while being capable of handling materials having a viscosity up to 100,000 centipoises and operating at pressures up to 2,000 pounds per square inch and temperatures up to 500° F. Preferably, the material must have a viscosity of at least 100 centipoises.

It will be understood that modifications and variations may be effected without departing from the scope of the novel concepts of the present invention, but it is understood that this application is to be limited only by the scope of the appended claims.

The invention is hereby claimed as follows:

1. A control valve adapted to handle the flow of material having a viscosity up to 100,000 centipoises operating at a temperature up to 500° F. and at a pressure up to 2,000 pounds per square inch, said valve comprising, a valve body having a cylindrical plug bore therein and coaxially aligned inlet and outlet ports, coaxially aligned openings through and normal to said plug bore communicating respectively with said inlet and outlet ports, said body having seats formed therein by the openings in the plug bore leading to the inlet and outlet ports, a cylindrical plug rotatably mounted in said plug bore along an axis normal to the axes of the ports and openings and in engagement with said seats, the engaging surfaces of said plug bore and plug having a minimum of tolerance therebetween, said plug having a transversely extending passageway coacting with the seats to selectively permit controlled fluid flow therebetween, a plurality of O-rings around the periphery of the plug sealing same with the plug bore above said passageway, a valve stem extending from said plug and through said body for access exteriorly thereof, a valve cap fastened to said body for retaining and positioning the plug relative to the valve seats, said valve stem having a threaded portion extending outward of said valve cap, and a lock nut on said threaded portion coacting with the valve cap to selectively lock the valve stem and plug to said valve cap at any rotated position.

2. The valve as defined in claim 1, wherein the tolerance between the plug and plug bore is between .0002 and .0006 inch.

3. A control valve adapted to handle the flow of material having a viscosity up to 100,000 centipoises operating at a temperature up to 500° F. and at a pressure up to 2,000 pounds per square inch, said valve comprising, a valve body having a cylindrical plug bore therein and coaxially aligned inlet and outlet ports, coaxially aligned openings through and normal to said plug bore communicating respectively with said inlet and outlet ports, said body having seats formed therein by the openings in the plug bore leading to the inlet and outlet ports, a cylindrical plug rotatably mounted in said plug bore along an axis normal to the axes of the ports and openings and in engagement with said seats, the engaging surfaces of said plug bore and plug having a minimum tolerance therebetween, said plug having a transversely extending passageway coacting with the seats to selectively permit controlled fluid flow therebetween, a plurality of O-rings around the periphery of the plug sealing same with the plug bore above said passageway, a valve stem extending from said plug and through said body for access exteriorly thereof, a valve cap fastened to said body for retaining and positioning the plug relative to the valve seats but permitting rotation thereof, and separate lock nut means for selectively locking the valves stem and plug to said valve cap at any rotated position.

4. The valve as defined in claim 3, wherein the tolerance between the plug and plug bore is between .0002 and .0006 inch.

References Cited

UNITED STATES PATENTS

| | | | |
|---|---|---|---|
| 1,354,460 | 9/1920 | Heylman | 251—312 |
| 1,495,630 | 5/1924 | Bees | 137—385 |
| 1,671,594 | 5/1928 | Kohlmann | 251—90 |
| 2,208,394 | 7/1940 | Scherer | 251—312 |
| 2,276,929 | 3/1942 | Church | 251—312 |
| 2,664,263 | 12/1953 | Stadler | 251—309 |
| 2,748,794 | 6/1956 | Dodds | 137—385 |
| 2,876,987 | 3/1959 | Renfro | 251—312 |
| 3,004,550 | 10/1961 | Poisker | 251—317 X |
| 3,048,191 | 8/1962 | Crang | 251—317 X |
| 3,257,096 | 6/1966 | Floren et al. | 251—317 X |

FOREIGN PATENTS

| | | |
|---|---|---|
| 1,373,417 | 8/1964 | France. |

M. CARY NELSON, *Primary Examiner.*

R. C. MILLER, *Assistant Examiner.*